(12) United States Patent
Burns

(10) Patent No.: US 7,650,927 B2
(45) Date of Patent: Jan. 26, 2010

(54) OUTLET TEMPERATURE CALCULATION CORRECTION FROM AMBIENT/WATER TEMPERATURE

(75) Inventor: Trevor Burns, Milford Center, OH (US)

(73) Assignee: Honda Motor Co., Ltd., Tokyo (JP)

(*) Notice: Subject to any disclaimer, the term of this patent is extended or adjusted under 35 U.S.C. 154(b) by 486 days.

(21) Appl. No.: 11/687,191

(22) Filed: Mar. 16, 2007

(65) Prior Publication Data

US 2008/0223054 A1 Sep. 18, 2008

(51) Int. Cl.
*B60H 3/00* (2006.01)
(52) U.S. Cl. .............. 165/42; 237/12.3 A; 237/12.3 B; 236/49.3; 236/91 D; 236/91 F
(58) Field of Classification Search .............. 165/42, 165/43, 202, 291; 236/49.3, 91 D, 91 F, 236/91 G; 237/12.3 A, 12.3 B
See application file for complete search history.

(56) References Cited

U.S. PATENT DOCUMENTS

| 4,982,895 | A | 1/1991 | Shimizu et al. | |
|---|---|---|---|---|
| 5,775,415 | A | 7/1998 | Yoshimi et al. | |
| 2004/0231824 | A1* | 11/2004 | Paolillo et al. | 165/11.1 |
| 2006/0162359 | A1 | 7/2006 | Fujiki et al. | |

FOREIGN PATENT DOCUMENTS

| JP | 57044512 | 3/1982 |
|---|---|---|
| JP | 58101815 | 6/1983 |
| JP | 59067117 | 4/1984 |
| JP | 4135915 | 5/1992 |
| JP | 5193336 | 8/1993 |
| JP | 10035244 | 2/1998 |
| JP | 11334354 | 12/1999 |

* cited by examiner

*Primary Examiner*—Sam Chuan C Yao
*Assistant Examiner*—Jonathan Bradford
(74) *Attorney, Agent, or Firm*—Mark E. Duell; Rankin Hill & Clark LLP

(57) ABSTRACT

A method of controlling a vehicle heating, ventilation, and air conditioning (HVAC) system. Outside or ambient temperature, evaporator temperature, and coolant temperature are measured with sensors. These values, along with a TAO, which is a calculated value of outlet temperature in the vehicle, are sent to a controller. The controller determines a predicted heater core outlet temperature based upon the coolant temperature. Based upon the outside air temperature and coolant temperature, the controller will decide whether to use the previously determined estimated heater core outlet temperature or to substitute an alternate value for the heater core outlet temperature to determine a position for the air mix door. After calculating the air mix door position, the controller signals an air mix door movement device to adjust the air mix door to the required position. Position of the air mix door affects the air temperature inside of the vehicle.

5 Claims, 4 Drawing Sheets

OUTLET TEMPERATURE CALCULATION CORRECTION FROM AMBIENT/WATER TEMPERATURE

BACKGROUND OF THE INVENTION

1. Field of the Invention

The present invention is directed toward a method for controlling a vehicle heating, ventilation, and air conditioning (HVAC) system.

2. Description of Related Art

In modern vehicles it is common to have an HVAC system for an occupant compartment (hereinafter "cabin"). The HVAC system provides warm and cool air to the cabin of the vehicle. Further, an HVAC control system allows occupants to select a set temperature for the cabin. Once the set temperature is selected, the HVAC control system provides conditioned air to adjust the climate of the cabin.

The conditioned air that is heated is typically provided to the cabin by passing outside air through a heater core before being discharged into the cabin. The conditioned air that is cooled is typically provided to the cabin by passing outside air through an evaporator before being discharged into the cabin. Many times, the HVAC control system includes a controller that automatically makes adjustments, based upon the set temperature, to raise or lower the temperature of the conditioned air.

For example, the position of an air mix door determines the amount of air that can flow through the heater core. The more air that flows through the heater core, the warmer the air in the cabin will become. Typically, the position of the air mix door is controlled by the controller. Usually, the controller determines the position of the air mix door by a calculation that includes several variables. For example, the temperature of the evaporator and the calculated outlet temperature are used in the calculation. Further, a predicted temperature of air leaving the heater core, which is based upon engine coolant temperature, is used.

However, it has been found that during cold outside air temperatures, the calculation used to determine the position of the air mix door and the related subsequent control of the air mix door, results in an under-heating of the cabin. It can be appreciated that this under-heating of the cabin is undesirable.

Therefore, there exists a need in the art for a method to better control the HVAC system so as to provide conditioned air that will properly adjust the cabin air to maximize occupant comfort.

SUMMARY OF THE INVENTION

The present invention is directed toward an HVAC system that more accurately controls a position of the air mix door when outside temperature is low and engine coolant is warm.

More specifically, the present invention relates to controlling an HVAC system for a vehicle cabin, the system including a controller, a coolant temperature sensor, an evaporator temperature sensor, and an ambient air temperature sensor. The coolant and evaporator temperature sensors measure the temperature of engine coolant and of an evaporator, respectively. The ambient air temperature sensor measures the outside air temperature ($T_{am}$). A predicted heater core outlet temperature ($T_h$) is based upon the engine coolant temperature ($T_w$). Depending on the outside air temperature ($T_{am}$) and the engine coolant temperature ($T_w$), the controller substitutes an alternate heater core outlet temperature ($T_h'$) for the predicted heater core temperature ($T_h$) when calculating an air mix door position (SW %). More specifically, when the outside air temperature ($T_{am}$) is low and the coolant temperature ($T_w$) is warm, the controller uses the alternate heater core outlet temperature ($T_h'$), which is typically smaller in magnitude than the predicted heater core temperature ($T_h$). By utilizing the alternate heater core outlet temperature ($T_h'$) when the outside air temperature ($T_{am}$) is low and the coolant temperature ($T_w$) is warm, a more accurate estimate of the temperature of the air leaving the heater core is realized. This more accurate estimate ensures that the air mix door is positioned so as to allow the proper amount of heated air into the cabin, thereby ensuring that the cabin is not under-heated.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
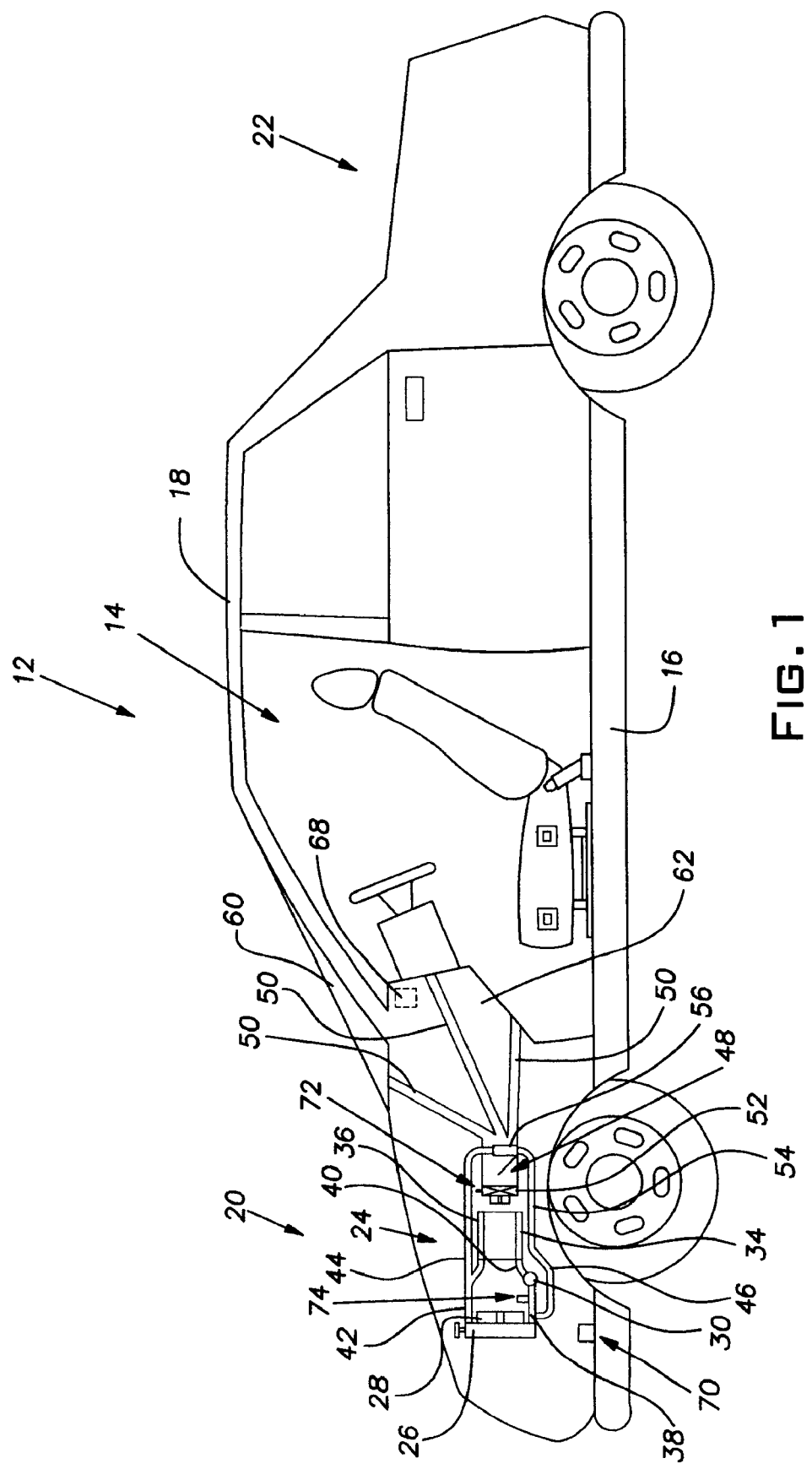
FIG. 1 is a side view of a vehicle with an HVAC control system of the present invention.
Figure 2:
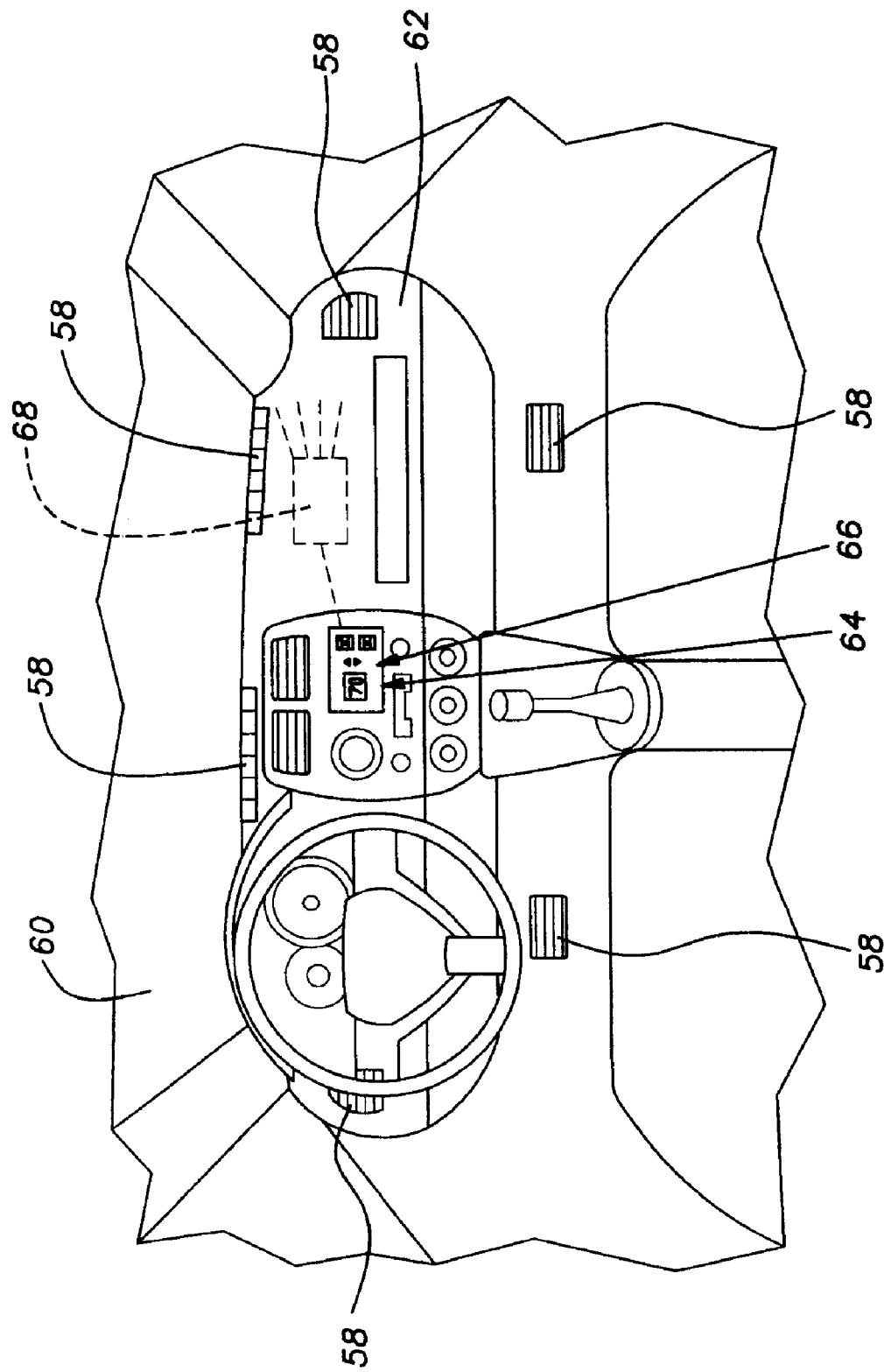
FIG. 2 is an perspective view of an interior of the vehicle of FIG. 1.
Figure 3:
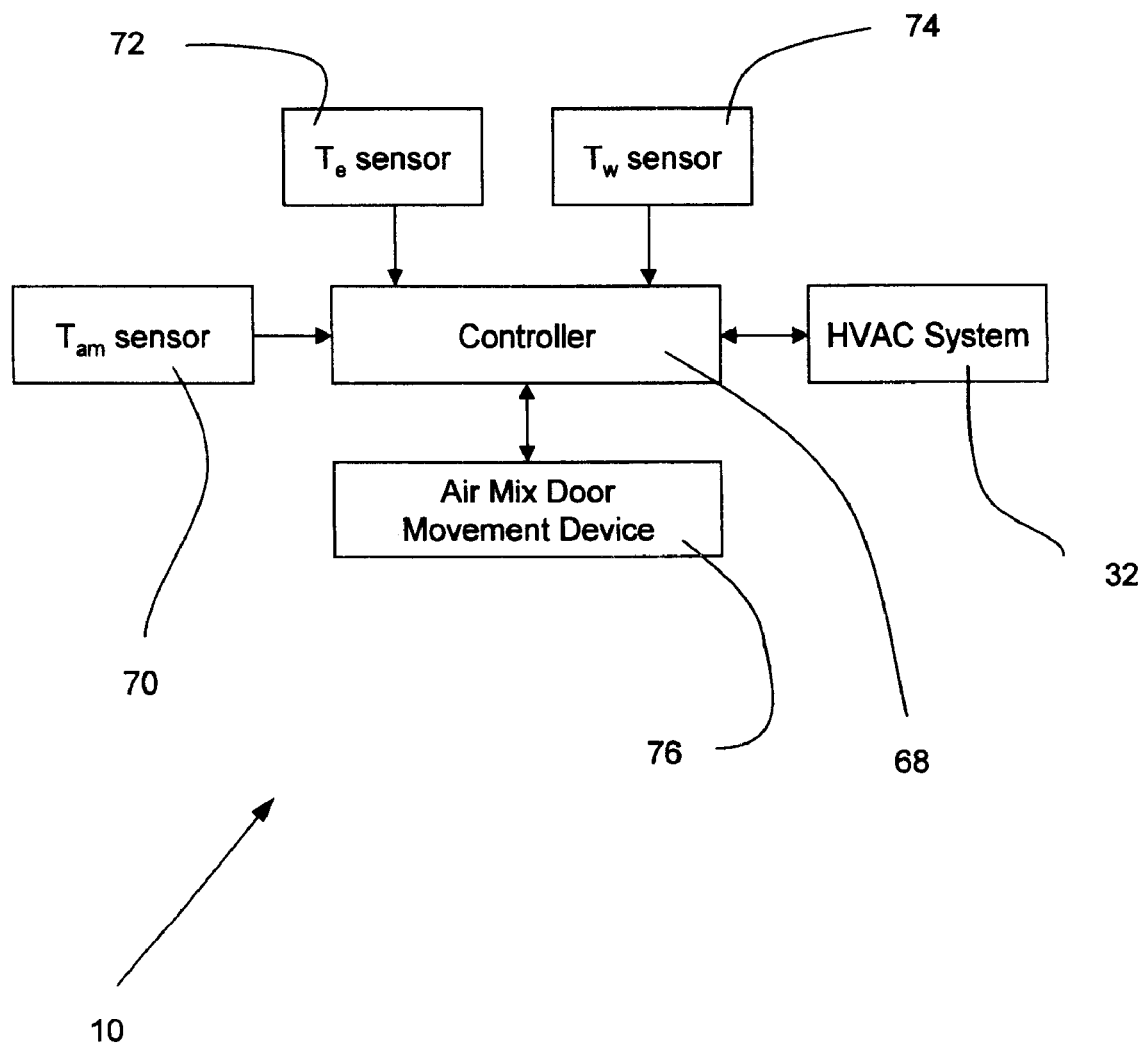
FIG. 3 is a schematic diagram illustrating the relationship between various components of the HVAC control system.

With reference to FIGS. 1-3, an HVAC control system 10 for use in a vehicle 12 according to the present invention is shown. The vehicle 12 includes a cabin 14 bounded by a floor 16, a roof 18, doors (not shown), an engine compartment area 20, and a storage area 22. An engine 24, a radiator 26, a radiator fan 28, a coolant pump 30, and several parts of an HVAC system 32 are disposed in the engine compartment 20. Inside of the engine 24 are a supply passageway 34 and a discharge passageway 36, each for containing engine coolant. A variety of hoses, such as a first supply hose 38, a second supply hose 40, a discharge hose 42, a heater core supply hose 44, and a heater core discharge hose 46 allow coolant to circulate. The HVAC system 32 includes an air mix door 48, a compressor, a condenser, ducts 50, a dryer, an evaporator 52, an evaporator fan 54, an expansion valve, a heater core 56, and outlets 58, as is well known in the art. The compressor, the condenser, the dryer, the evaporator 52, and the expansion valve are responsible for cooling the air, while the heater core 56 is responsible for warming the air. Additionally, the air mix door 48, the ducts 50, the evaporator fan 54, and the outlets 58 ensure that the conditioned air is supplied to the cabin 14.

For ease of understanding, since the compressor, the condenser, the dryer, and the expansion valve are not central to the invention, they are not illustrated. However, it is considered apparent how these components interact with the present invention.

In addition to being bounded by the engine compartment 20 and the storage area 22, the cabin 14 is further defined by a windshield 60 and a dashboard 62. Located on the dashboard 62 are a temperature display 64, an input device 66 for changing a set temperature, and the outlets 58 for dispersing conditioned air. Located in or behind the dashboard 62 is a controller 68, which is part of the control system 10. The control system 10 also includes an ambient temperature sensor 70, an evaporator temperature sensor 72, and a coolant temperature sensor 74.

The ambient temperature sensor 70, evaporator temperature sensor 72, and coolant temperature sensor 74 are illustrated as being disposed at distinct locations in the engine compartment 20. However, it is considered clear that other locations in the vehicle 12 also offer appropriate positions for placement of the sensors 70, 72, 74. For example, the coolant temperature sensor 74 could be placed anywhere near where the coolant flows that would allow accurate measurement of the coolant temperature ($T_w$). Further, the ambient temperature sensor 70 could be disposed anywhere on the vehicle 12 that would provide satisfactory measurement of the outside air temperature ($T_{am}$). Finally, the evaporator temperature sensor 72 can be situated either on or around the evaporator 52 so as to allow adequate temperature measurement of the evaporator 52. These sensors are illustrated as being of a contact type, however use of non-contact measurement type devices is also envisioned.

Operation of the vehicle 12 causes the engine 24 to gain heat from the combustion process. As the engine 24 operates, the coolant circulates through the discharge passageway 36 and absorbs heat. After leaving the engine 24, the coolant passes through the discharge hose 42 and enters the radiator 26 and the heater core supply hose 44.

For the coolant that enters the radiator 26, the radiator fan 28 ensures that an adequate amount of air blows through the radiator 26 to sufficiently cool the coolant. Next, the coolant leaves the radiator 26 through the first supply hose 38 and enters the pump 30. It is noted that the coolant temperature ($T_w$) is measured with the coolant temperature sensor 74 prior to entering the pump 30. However, as previously disclosed, the coolant temperature ($T_w$) could be measured at a number of other locations. Coolant then leaves the pump 30 and enters the supply passageway 34 to again absorb heat from the engine 24. Further, coolant is communicated from the supply passageway 34 to the discharge passageway 36 with an interconnecting passageway (not shown).

Additionally, coolant travels through the heater core supply hose 44 to reach the heater core 56. After passing through the heater core 56, the coolant is communicated through the heater core discharge hose 46 to the pump 30. After entering the pump 30, the coolant is discharged into the second supply hose 40, which is connected with the supply passageway 34 of the engine 24.

In order to adjust air temperature in the cabin 14, an occupant (not shown) would change the set temperature on the temperature display 64 with the input device 66. The set temperature is communicated to the controller 68, as is the outside air temperature ($T_{am}$) that is sensed by the ambient temperature sensor 70. In addition, the controller 68 receives the evaporator ($T_e$) and coolant ($T_w$) temperatures from the evaporator and coolant temperature sensors (72, 74), respectively. By knowing the coolant temperature ($T_w$), the controller 68 can estimate or predict the heater core outlet temperature ($T_h$).

Based upon the signal received from the ambient air temperature sensor 70 and the coolant temperature sensor 74, the controller 68 either selects the predicted heater core outlet temperature ($T_h$) that is based upon the coolant temperature ($T_w$), or an alternate heater core outlet temperature ($T_h'$) that is based upon the outside air temperature ($T_{am}$) and the coolant temperature ($T_w$). After selecting either the predicted or alternate heater core outlet temperature ($T_h$ or $T_h'$), the controller 68 calculates the air mix position (SW %) with the following equation:

$$SW\ \% = \frac{TAO - T_e}{T_{hs} - T_e} \times 100 + \alpha \quad (1)$$

where:
SW %=Air Mix Door Position
TAO=Calculated Temperature from the Outlet
$T_e$=Evaporator Temperature
$T_{hs}$=Selected Heater Core Outlet Temperature (either the predicted or alternate heater core outlet temperature ($T_h$ or $T_h'$))
α=Mode Compensation Factor.

Based upon the calculated air mix door position (SW %), the controller 68 transmits the signal necessary for an air mix door movement device 76 to move the air mix door 48 into the appropriate orientation. As the evaporator fan 54 forces air through the heater core 56, movement of the air mix door 48 causes more or less air to be channeled through the heater core 56.

It is noted that TAO is a calculated value of outlet temperature, a term that is well known in the art and may be based upon a number of parameters, such as sensed cabin temperature, solar load, outside air temperature ($T_{am}$), etc., but is primarily based upon the desired cabin set temperature input by the occupant. It is also known in the art that the calculated outlet temperature (TAO) is commonly used in the automatic mode of operation to control fan speed and vent selection. This control setting can be modified in some portions of the control system 10 to provide for improved response, so as to help achieve a desired level of perceived comfort on the part of the occupants in the vehicle cabin 14. Further, the mode compensation factor (α) is based upon an operating state of the HVAC system 32. The HVAC system 32 may be operated in for example a heater, bi-level, vent, or defrost mode and each of these modes has a compensation factor (α) associated therewith.

The alternate heater core outlet temperature ($T_h'$) is preferably determined with a second lookup table located in the controller 68. In order to determine the alternate heater core outlet temperature ($T_h'$), first a modified coolant temperature ($T_w'$), which is based upon the outside air temperature ($T_{am}$), must be ascertained. Table A shows the relationship between the outside air temperature ($T_{am}$) and the modified coolant temperature ($T_w'$).

TABLE A

| | $T_{am}$ | | | | | | |
|---|---|---|---|---|---|---|---|
| | >20 | 20 | 10 | 0 | −10 | −20 | <−20 |
| $T_w'$ | 74 | 74 | 74 | 71 | 68 | 68 | 68 |

Next, the alternate heater core outlet temperature ($T_h'$) is determined based upon the coolant temperature ($T_w$) and the modified coolant temperature ($T_w'$), according to Table B, as shown below.

TABLE B

| | <20 | 20 ≦ $T_w$ < $T_w'$ | $T_w$ ≧ $T_w'$ | ERROR |
|---|---|---|---|---|
| $T_w$ | | | | |
| $T_h'$ | 20 | $T_w$ | $T_w'$ | $T_w'$ |

As shown in Table B, depending on the coolant temperature ($T_w$), the corresponding alternate heater core outlet temperature ($T_h'$) is selected. Further, if there are difficulties in measuring the coolant temperature ($T_w$), the modified coolant temperature ($T_w'$) is used as the alternate heater core outlet temperature ($T_h'$).

As shown in FIG. 3, the HVAC system 32, the temperature display 64, the ambient temperature sensor 70, evaporator temperature sensor 72, the coolant temperature sensor 74, and the air mix door movement device 76 are electrically connected to the controller 68. However, other means, such as for example wireless or fiber-optic communication means to connect the components 32, 64, 70, 72, 74, 76 with the controller 68, are possible and contemplated.

Figure 4:
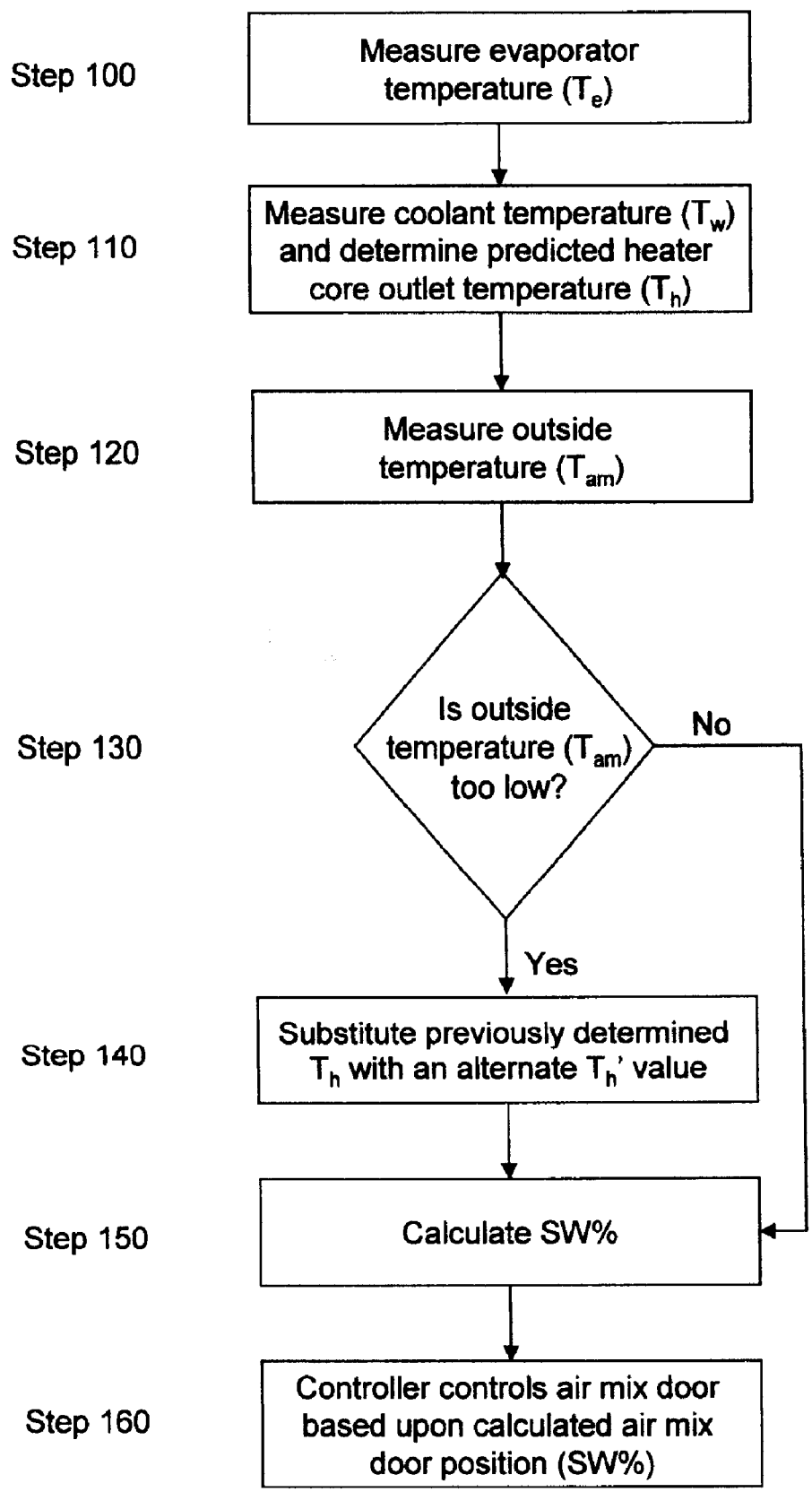
FIG. 4 is a flowchart illustrating a method according to the present invention.

A method of using the present invention is illustrated in FIG. 4. In Step 100, the evaporator temperature ($T_e$) is measured. Then, the coolant temperature ($T_w$) is measured and the predicted heater core outlet temperature ($T_h$) is determined (Step 110). Preferably, the predicted heater core outlet temperature ($T_h$) is determined with a first lookup table that is based upon the coolant temperature ($T_w$). More specifically, as the coolant temperature ($T_w$) increases in value, the predicted heater core outlet temperature ($T_h$) will increase in value. The outside air temperature ($T_{am}$) is also measured (Step 120). In Step 130, the controller 68 determines if the outside air temperature ($T_{am}$) is too low. If the outside air temperature ($T_{am}$) is deemed too low, an alternate heater core outlet temperature ($T_h'$) is substituted for the predicted heater core outlet temperature ($T_h$) (Step 140). Preferably, the alternate heater core outlet temperature ($T_h'$) is determined with a second lookup table, and is based upon the outside air temperature ($T_{am}$), the coolant temperature ($T_w$), and the modified coolant temperature ($T_w'$). The air mix door position (SW %) is determined based upon either the predicted heater core temperature ($T_h$) or the alternate heater core outlet temperature ($T_h'$) (Step 150). In Step 160, the controller 68 controls the air mix door 48 based upon the calculated air mix door position (SW %) of Step 150.

Experimentally it has been determined that many times a temperature below approximately 16° C. is considered low in most conditions. More specifically, temperatures below 11° C. are low. However, other conditions could yield a different determination of what temperatures would be considered low and this is possible and contemplated.

Thus, when the outside air temperature ($T_{am}$) is low, the controller 68 uses an alternate heater core outlet temperature ($T_h'$) in place of the predicted heater core outlet temperature ($T_h$) to determine the air mix door position (SW %). By using the alternate heater core outlet temperature ($T_h'$), which is derived from the outside air temperature ($T_{am}$) and the coolant temperature ($T_w$), the air mix door 48 is adjusted so an adequate amount of air passes through the heater core 56.

As previously described, position of the air mix door 48 determines how much air passes through the heater core 56. The more air that passes through the heater core 56, the warmer the cabin 14 will become. By compensating for cold outside air temperatures ($T_{am}$) with proper adjustment of the air mix door 48, air discharged from the outlets 58 more closely matches the TAO. Further, as discussed hereinbefore, the TAO is the calculated value of outlet temperature and primarily based upon the set temperature as input by the occupant. The present invention ensures that the inside of the cabin 14 is adequately heated and occupant comfort is maintained regardless of outside air temperature ($T_{am}$).

For example, prior to the present invention, it was experimentally determined that when the outside air temperature ($T_{am}$) was equal to −10° C., the predicted heater core outlet temperature ($T_h$) was equal to 74° C., the evaporator temperature ($T_e$) was equal to −8° C., the mode compensation factor ($\alpha$) was equal to 5, and the TAO was equal to 55° C., the air mix door position (SW %) was calculated to be 82%. Unfortunately, when the air mix door position (SW %) was set to 82%, the temperature of the air leaving the outlet 58 was measured to be only 45° C., instead of the desired TAO of 55° C. With the present invention and the same outside air temperature ($T_{am}$), evaporator temperature ($T_e$), mode compensation factor ($\alpha$), and TAO of the previous example, but with the alternate heater core outlet temperature ($T_h'$) of 68° C., the air mix door position (SW %) is set to 88%. This results in the actual temperature of the air leaving the ducts 58 being equal to the TAO.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A method of controlling a vehicle HVAC system with an evaporator, coolant, and an air mix door, comprising the steps of:
    measuring a temperature of the evaporator;
    measuring a temperature of the coolant;
    determining a predicted heater core outlet temperature;
    measuring an outside air temperature;
        wherein, when the outside air temperature is low, using an alternate heater core outlet temperature instead of the predicted heater core outlet temperature;
    calculating an air mix door position based upon either the predicted heater core outlet temperature or the alternate heater core outlet temperature;
    and adjusting the air mix door based upon the calculated air mix door position.

2. The method of controlling the vehicle HVAC system of claim 1, wherein the step of determining the predicted heater core outlet temperature is based upon the measured coolant temperature.

3. The method of controlling the vehicle HVAC system of claim 1, wherein the step of determining the alternate heater core outlet temperature is based upon the measured outside air temperature.

4. The method of controlling the vehicle HVAC system of claim 1, wherein during the step of determining when the outside air temperature is low, the outside air temperature is determined to be low if less than 16° C.

5. The method of controlling the vehicle HVAC system of claim 4, wherein the outside air temperature is determined to be low if less than 11° C.

* * * * *